United States Patent
Alber

(10) Patent No.: US 8,263,898 B2
(45) Date of Patent: Sep. 11, 2012

(54) DEVICE FOR PRODUCING TAILORED BLANKS BY CUTTING WELDING SHEETS TO BE JOINED

(75) Inventor: Gerhard Alber, Berg (DE)

(73) Assignee: ThyssenKrupp Lasertechnik GmbH (DE)

(*) Notice: Subject to any disclaimer, the term of this patent is extended or adjusted under 35 U.S.C. 154(b) by 361 days.

(21) Appl. No.: 12/599,981

(22) PCT Filed: May 15, 2008

(86) PCT No.: PCT/EP2008/055995
§ 371 (c)(1),
(2), (4) Date: Dec. 22, 2009

(87) PCT Pub. No.: WO2008/138973
PCT Pub. Date: Nov. 20, 2008

(65) Prior Publication Data
US 2010/0140234 A1 Jun. 10, 2010

(30) Foreign Application Priority Data
May 15, 2007 (DE) .......................... 10 2007 023 017

(51) Int. Cl.
*B23K 26/00* (2006.01)
(52) U.S. Cl. .................. 219/121.64; 219/121.76; 901/42
(58) Field of Classification Search .................. None
See application file for complete search history.

(56) References Cited

U.S. PATENT DOCUMENTS

| | | | |
|---|---|---|---|
| 4,650,954 A | 3/1987 | Frings et al. | |
| 7,081,599 B2* | 7/2006 | Aebersold | 219/121.63 |
| 7,132,622 B2* | 11/2006 | Ito et al. | 219/121.82 |
| 2002/0050488 A1* | 5/2002 | Nikitin et al. | 219/121.64 |
| 2005/0021170 A1 | 1/2005 | Gustafsson et al. | |

FOREIGN PATENT DOCUMENTS

| | | |
|---|---|---|
| EP | 0522811 | 8/1996 |
| EP | 1238746 | 9/2002 |
| EP | 1166949 | 11/2004 |
| JP | 59225897 | 12/1984 |
| JP | 60121089 | 6/1985 |
| JP | 05285688 | 11/1993 |

OTHER PUBLICATIONS

International Preliminary Report on Patentability for PCT/EP2008/055995 dated Feb. 1, 2010.

* cited by examiner

*Primary Examiner* — Benjamin Sandvik
(74) *Attorney, Agent, or Firm* — Honigman Miller Schwartz and Cohn; Kathryn D. Soulier; Jonathan P. O'Brien

(57) ABSTRACT

The invention relates to a device and a method for producing tailored blanks. The device comprises a workpiece carrier for the sheets (15a, 15b) that are to be joined into tailored blanks in the butt joint by welding. The invention further comprises a plurality of laser welding heads (14a, 14b), which are arranged one behind the other over the workpiece carrier and along the butt joint to be welded and can be moved with an advancing device (11a, 11b), wherein the heads can be aligned with the joint using positioning means, wherein at least two combined laser cutting and welding heads (14a, 14b) are carried by at least two independent arms (13a, 13b), each associated with independent units (11a, 11b) of the advancing device, and wherein the positioning means can adjust the distances of the units (11a, 11b) in the direction of the butt joint and also the distances of the cutting and welding heads (14a, 14b) in the transversal direction to the butt joint.

22 Claims, 6 Drawing Sheets

DEVICE FOR PRODUCING TAILORED BLANKS BY CUTTING WELDING SHEETS TO BE JOINED

Figure 1:
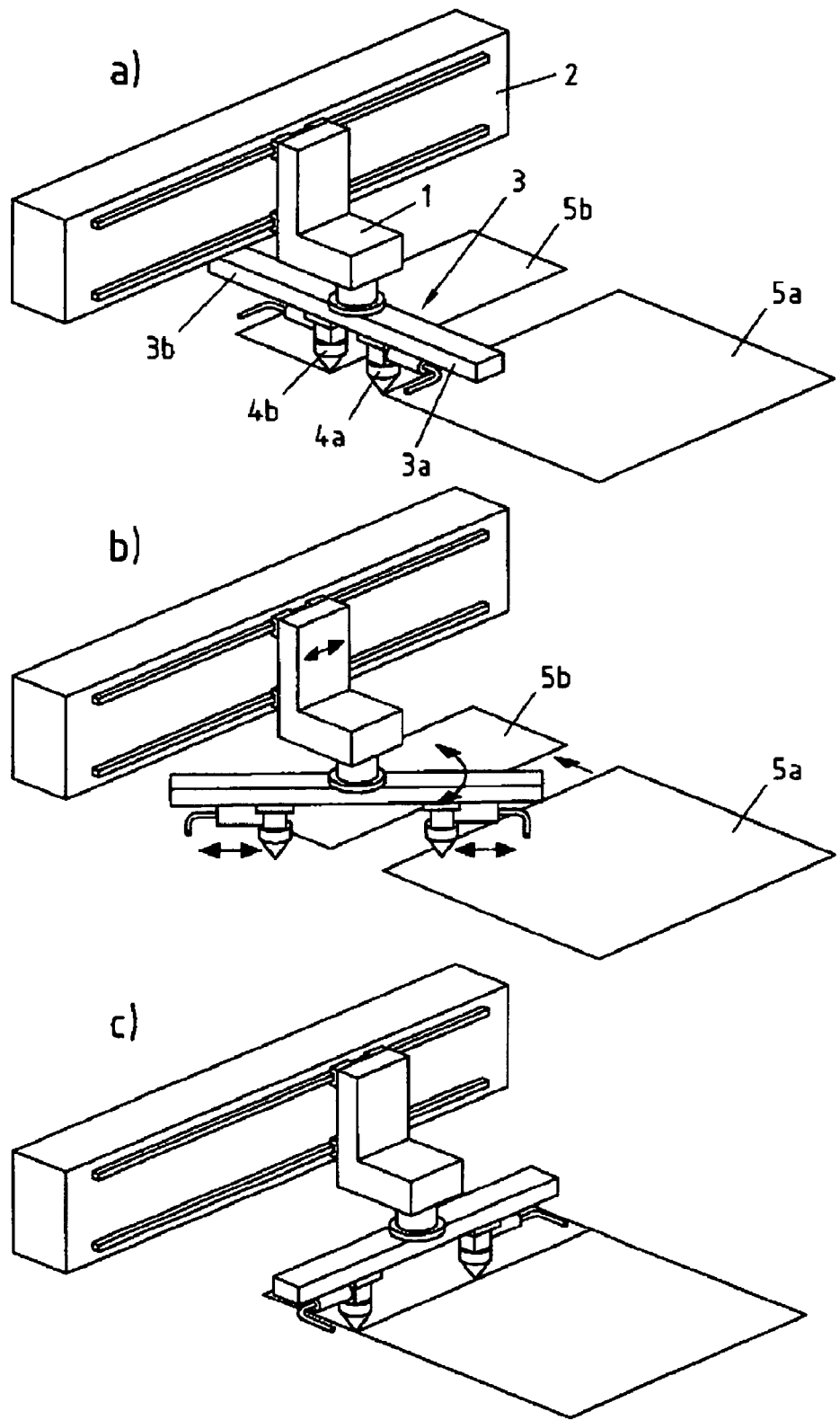

This application is the U.S. National phase of PCT Application No. PCT/EP2008/055995 filed, May 15, 2008, which claims the priority of German Application No. DE 10 2007 023 017.8-34, filed May 15, 2007. Both of these documents are incorporated herein in their entirety.

The invention relates to a device for producing tailored blanks with a workpiece carrier for the sheets that are to be joined into the tailored blank in the butt joint by welding and with a plurality of laser welding heads which are arranged one behind the other above the workpiece carrier and along the butt joint seam to be welded and can be moved with an advancing device, wherein the heads can each be aligned with the joint using positioning means.

In a known device for producing tailored blanks of the aforementioned kind (EP 0 522 811 B1), the workpiece carrier is designed as a two-piece table, the two parts whereof hold together, during the welding process, the two sheets to be joined in the butt joint and previously processed at their abutting edges. The seam to be welded is divided into a plurality of segments and is processed simultaneously by the various laser welding heads arranged spaced apart one behind the other. As a result of this simultaneous processing of a plurality of segments, the welding time required for the welding of a long seam is shortened according to the number of welding heads. In order to align the individual welding heads by means of positioning means exactly on the seam to be welded, a weld tracking system with which the butt joint is scanned is assigned to each welding head.

Another known device for producing tailored blanks (EP 1 166 949 B1) also comprises a workpiece carrier for the sheets to be joined in the butt joint. The workpiece carrier comprises two table parts, one of which is adjustable in the direction of the other. The two table parts are each used to hold a sheet, which is cut at one edge by means of a combined laser cutting and welding device. During this cutting, the combined laser cutting and welding head is guided in respect of a reference line by numerically controlled positioning means. After the two cut edges have thus been produced one after the other, the mobile table part of the workpiece carrier with the sheet held by it is moved in the direction of the sheet held by the other fixed table part of the workpiece carrier, so that the cut edges abut against one another. The combined cutting and welding head then moves along the butt joint and welds the two sheets together.

Finally, the device for producing a weld seam at two ends of two sheet strips to be joined together is known (EP 438 609 B1), wherein individual laser welding heads are provided for the cutting of the two ends. After the cutting, the two ends held by individual workpiece carriers can be pushed together so as to be abutting and welded to one another by means of a laser welding head.

The problem underlying the invention is to develop a device for producing tailored blanks, with which tailored blanks can be produced with high productivity and comparatively low equipment-related expenditure. It should be possible to produce not only linear weld seams, but also non-linear and offset weld seams.

This problem is solved with a device of the type mentioned at the outset, by the fact that at least two combined laser cutting and welding heads are carried by at least two independent arms, which are each associated with independent units of the advancing device, wherein the positioning means can adjust the distances of the units in the direction of the butt joint and also the distances of the cutting and welding heads in the transverse direction to the butt joint.

With the device according to the invention, the sheets to be joined together in the butt joint are simultaneously prepared for the welding by cutting at their edges. In each case, there is an associated considerable increase in productivity compared to the use of the described known devices. During the cutting of the sheets, the device needs to be moved only once along the edges of the sheets to be cut. During welding, the weld seam is split up into individual segments, which also leads to an increase in productivity by reducing the welding time. Since, in each case, the combined welding and cutting heads have their own positioning means, it is possible to produce not only linear welded seams, but also weld seams offset with respect to one another and welded seams running in a curved shape.

According to developments of the invention, with independent arms for adjusting the cutting and welding heads onto the edges to be welded or onto the butt joint, it is possible with the device for the arms to be swiveling and/or for each combined cutting and welding head to be adjustable on its arm.

To achieve high productivity of the device, it is advantageous if, on the side of the sheets to be joined facing away from the cutting and welding heads, means are provided for the removal of cutting and welding waste, said means being able to move simultaneously with the cutting and welding heads.

The invention also relates to a method for producing tailored blanks from sheets to be joined by welding in the butt joint, in particular using the aforementioned device. In this production, at least two combined laser cutting and welding heads, which are carried by at least two independent arms each associated with independent units of the advancing device, are moved simultaneously along the edges of the sheets held by a workpiece carrier, which edges are to be produced for the butt joint, wherein the edges are cut. After the cutting and bringing-together of the sheets for the butt joint and the holding of the sheets by the workpiece carrier, the two combined laser cutting and welding heads are moved simultaneously along the produced edges of the sheets held by the workpiece carrier, which edges form the butt joint, wherein the weld seam is produced in different successive segments.

In the case of protective gas welding, the device can comprise, on the side facing away from the cutting and welding heads, a protective gas supply which can be moved simultaneously with the cutting and welding heads.

Figure 2:
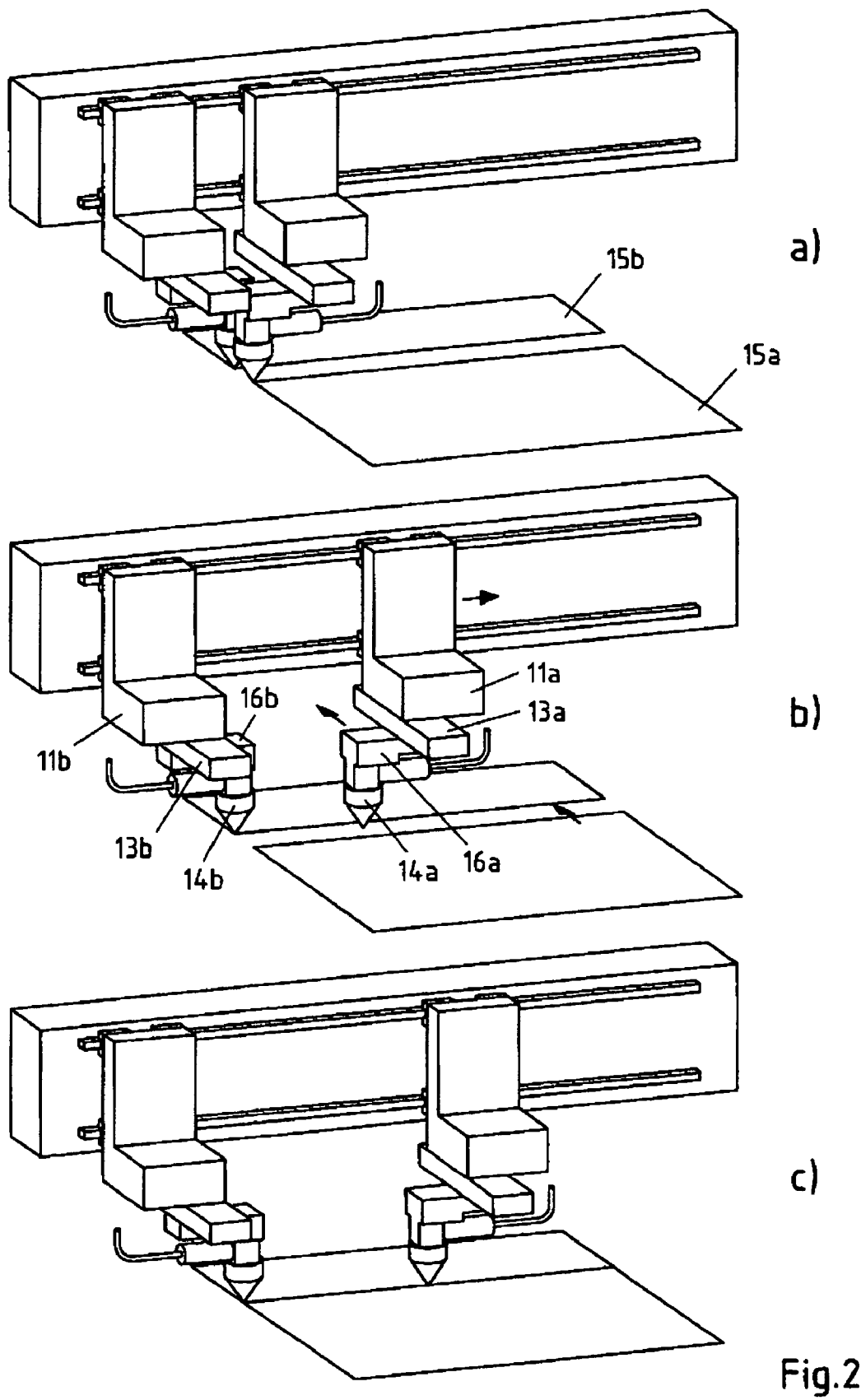
Figure 3:
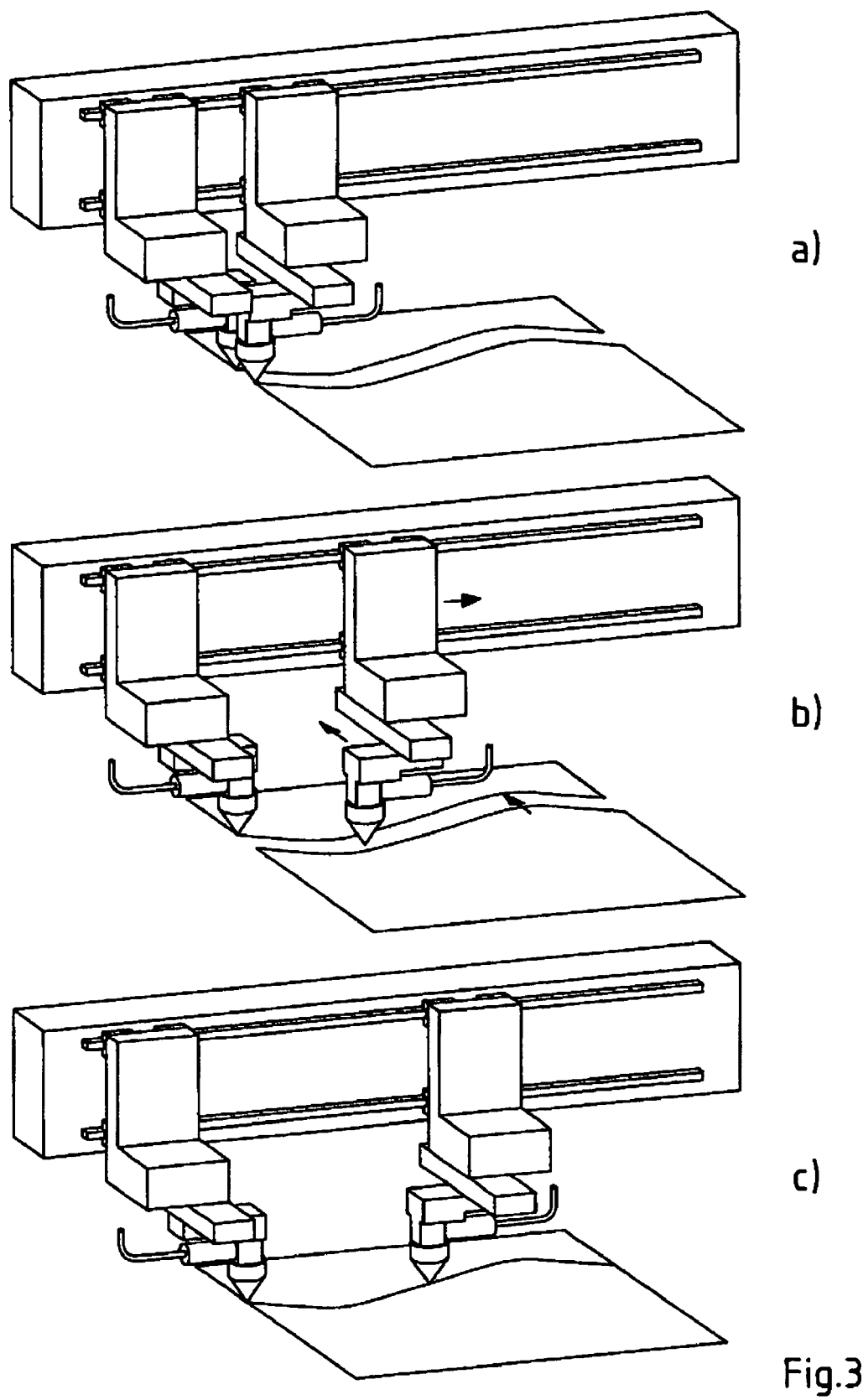
Figure 4:
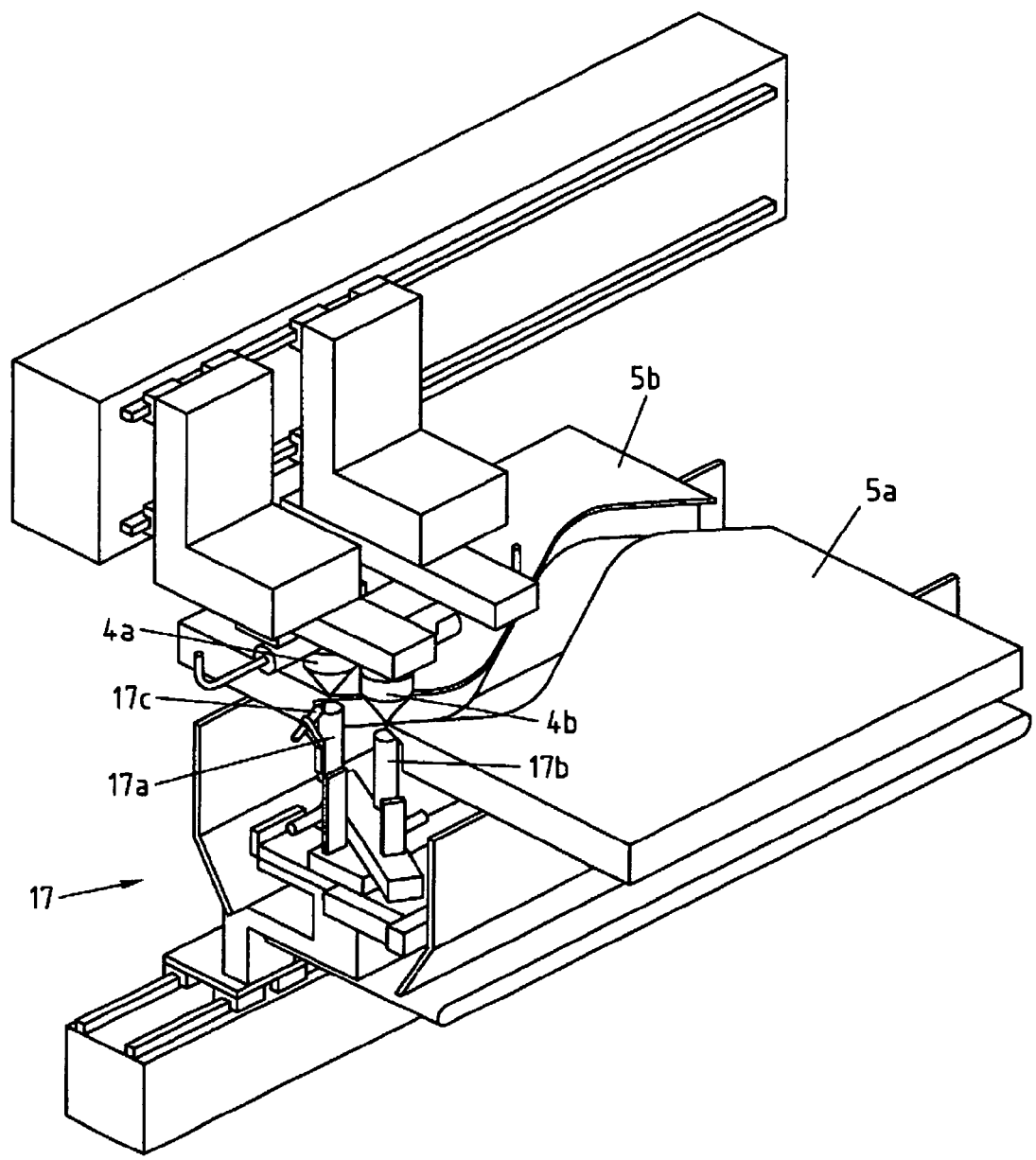
Figure 5:
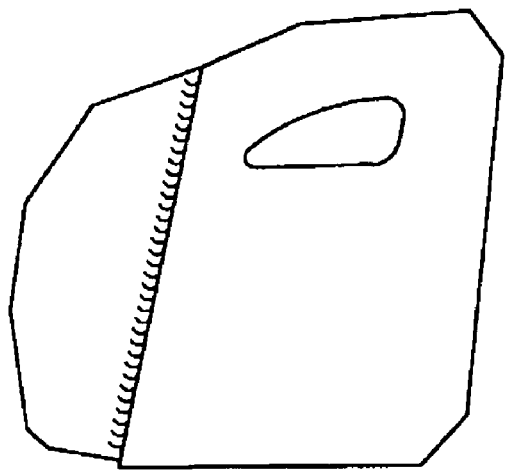
Figure 6:
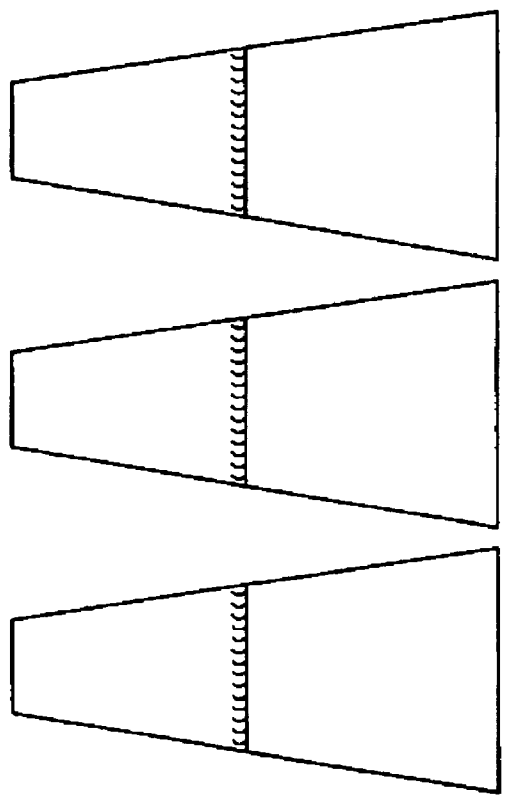
Figure 7:
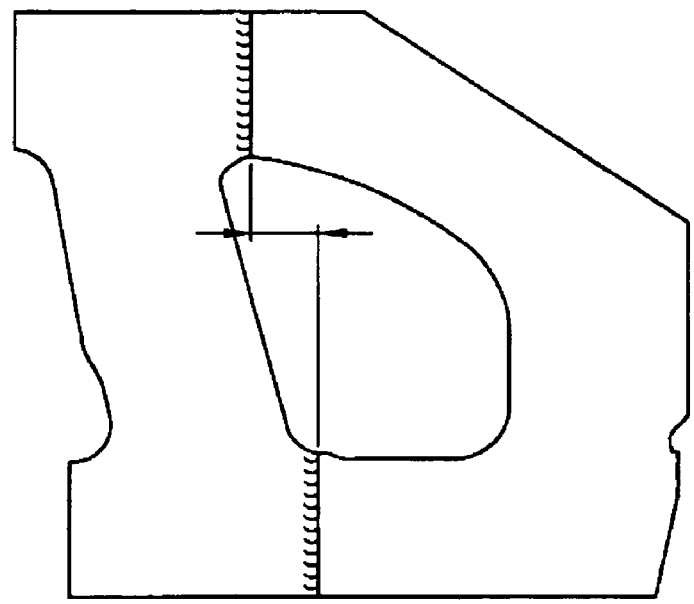
Figure 8:
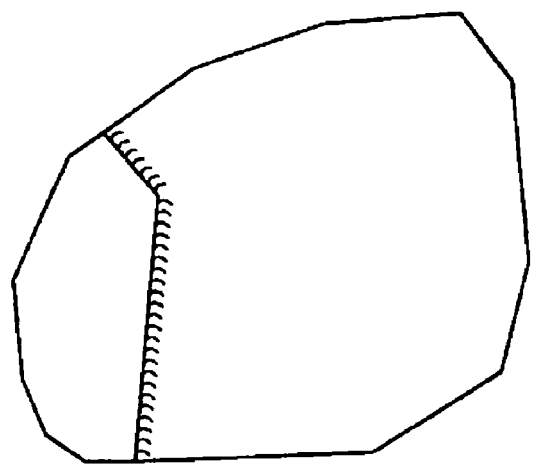

The invention is explained in greater detail below with the aid of a drawing representing examples of embodiment, wherein the representations are shown in a very schematized form. In the figures, in detail, FIG. 1 shows a device for producing tailored blanks with a linear weld seam in different phases of production in an isometric representation, FIG. 2 shows a device according to the invention for producing tailored blanks with a linear weld seam in different phases of production in an isometric representation, FIG. 3 shows the device according to FIG. 2 for producing tailored blanks with a non-linear weld seam in different phases of production in an isometric representation, FIG. 4 shows the device according to FIG. 3 with additional means for the removal of cutting and welding waste in an isometric representation, FIG. 5 shows a tailored blank with a linear continuous weld seam, FIG. 6 shows three tailored blanks with aligned linear weld seams, FIG. 7 shows a tailored blank with linear weld seams offset with respect to one another and FIG. 8 shows a tailored blank with a non-linear weld seam.

The device according to FIG. 1 comprises an advancing device 1 in the form of a carriage, which is carried by a guide rail 2 on which it can be moved linearly. Advancing device 1 for its part carries two swivel arms 3a, 3b combined into a double arm 3. Each swivel arm 3a, 3b carries a combined laser cutting and welding head 4a, 4b, such as is known per se (EP 1 166 949 B1). Cutting and welding heads 4a, 4b can be adjusted along their swivel arms 3a, 3b. The linear adjustability of advancing device 1 and that of cutting and welding heads 4a, 4b on swivel arms 3a, 3b as well as the swivelability of double arm 3 are indicated by arrows, the positioning means also being represented at the same time conceptualized.

Provided beneath advancing device 1 with double arm 3 and cutting and welding heads 4a, 4b is a workpiece carrier for two sheets 5a, 5b to be joined into a tailored blank, said workpiece carrier not being represented in the drawing and comprising two table parts which can be moved towards one another. Such workpiece carriers are also known per se (EP 1 166 949 B1; EP 0 522 811 B1). The workpiece carrier is able to hold the two sheets 5a, 5b during the processing and to bring them together to form the butt joint.

In the first phase a) of the production of a tailored blank, the two sheets 5a, 5b are held spaced apart from one another by the table parts of the workpiece carrier. The two cutting and welding heads 4a, 4b are adjusted for cutting. Parallel cut edges are produced when advancing device 1 is moved along sheets 5a, 5b.

In the next phase b), the two cuts sheets 5a, 5b are brought together by the workpiece carrier until they form a butt joint. For this purpose, both sheets 5a, 5b can be moved or just one sheet 5a is moved, as is represented.

Double arm 3 is swiveled in phase c) in preparation for the welding, so that the two cutting and welding heads 4a, 4b lie aligned one behind the other and aligned with the butt joint. As a rule, their spacing is enlarged so that, one after another, individual long segments of the weld seam to be produced can be welded simultaneously.

FIG. 2 represents a device according to the invention for producing tailored blanks. The device again comprises a guide rail 2 and combined cutting and welding heads 14a, 14b carried by individual arms 13a, 13b, arms 13a, 13b for their part being carried by individual units 11a, 11b of the advancing device. Cutting and welding heads 14a, 14b are carried not directly by arms 13a, 13b, but by extension arms 16a, 16b. With these extension arms 16a, 16b, they can be adjusted along arms 13a, 13b, so that they can for example assume a position directly beside one another, but can also be adjusted onto a line.

In the first phase a) of the production of a tailored blank, the two sheets 15a, 15b are held spaced apart from one another by the table parts of the workpiece carrier (not shown in detail). The two cutting and welding heads 14a, 14b are adjusted for cutting. Parallel cut edges are produced when independent units 11a, 11b of the advancing device are moved along sheets 5a, 5b.

In the next phase b), the two cuts sheets 15a, 15b are brought together by the workpiece carrier until they form a butt joint. For this purpose, both sheets 15a, 15b can be moved or just one sheet 15a is moved, as is represented in FIG. 2b).

In phase c), in preparation for the welding, the two cutting and welding heads 14a, 14b carried by extension arms 16a, 16b are adjusted along arms 13a, 13b in such a way that the two cutting and welding heads 14a, 14b lie aligned one behind the other and aligned with the butt joint. As a rule, the spacing is enlarged so that, one after another, individual long segments of the weld seam to be produced can be welded simultaneously.

The individual adjustment of cutting and welding heads 14a, 14b by means of extension arms 16a, 16b which can be moved on arms 13a, 13b also makes it possible to produce a non-linear weld seam, such as is represented for the example of embodiment of FIG. 3.

Within the scope of the invention according to the example of embodiment of FIG. 2, the individual alignment of cutting and welding heads 14a, 14b can be achieved; instead of by a linear adjustment, also by the swiveling of arms 13a, 13b and/or of extension arms 16a, 16b.

With the device for producing tailored blanks according to FIGS. 2 and 3, it is possible to produce linear and non-linear weld seams as well as weld seams offset with respect to one another, such as are represented in FIGS. 4 to 7.

Within the scope of the invention, it is also possible for means 17 for the removal of cutting and welding waste to be combined with cutting and welding heads 14a, 14b. In the example of embodiment according to FIG. 4, especially suction collectors 17a, 17b are provided beneath sheets 15a, 15b for this purpose, said collectors being able to be moved simultaneously with cutting and welding heads 14a, 14b. The structural design of the adjusting and advancing means essentially corresponds to that of cutting and welding heads 14a, 14b. Moreover, each collector 17a, 17b can be equipped with a blowing nozzle of a protective gas supply 17c.

The invention claimed is:

1. A device for producing tailored blanks with a workpiece carrier for the sheets (15a, 15b) that are to be joined into the tailored blank in the butt joint by welding and with a plurality of laser welding heads (14a, 14b) which are arranged one behind the other above the workpiece carrier and along the butt joint seam to be welded and can be moved with an advancing device (11a, 11b), wherein the heads can each be aligned with the joint using positioning means, wherein at least two combined laser cutting and welding heads (14a, 14b) are carried by extension arms (16a, 16b), which are carried by at least two independent arms (13a, 13b), which are each associated with independent units (11a, 11b) of the advancing device, wherein the extension arms (16a, 16b) are designed to be movable on the arms (13a, 13b), and in that the positioning means can adjust the distances of the units (11a, 11b) in the direction of the butt joint and also the distances of the cutting and welding heads (14a, 14b) in the transverse direction to the butt joint wherein the laser cutting and welding heads (14a, 14b) are carried by the extension arms (16a, 16b) with displacement in the advance direction with respect to the arms (13a, 13b) in such way that they can assume a position directly side by side relative to the advance direction or can be readjusted to be in line in the advance direction.

2. The device according to claim 1,
wherein the cutting and welding heads (14a, 14b) can be aligned individually by swiveling the arms (13a, 13b) and/or the extension arms (16a, 16b).

3. The device according to claim 1,
wherein the independent arms (13a, 13b) can be swiveled on their units (11a, 11b) with respect to the butt joint.

4. The device according to claim 1,
wherein each combined laser cutting and welding head (14a, 14b) can be adjusted in the direction of its arm (13a, 13b).

5. The device according to claim 1,
wherein on the side of the sheets (15a, 15b) to be joined facing away from the cutting and welding heads (14a, 14b), means (17) are provided for the removal of cutting and welding waste, said means being able to move simultaneously with the cutting and welding heads (4a, 4b).

6. The device according to claim 1,
wherein on the side of the sheets (15a, 15b) to be joined facing away from the cutting and welding heads (14a, 14b), a protective gas supply (17c) is provided, which can be moved simultaneously with the cutting and welding heads (4a, 4b).

7. The device according to claim 2, wherein the independent arms (13a, 13b) can be swiveled on their units (11a, 11b) with respect to the butt joint.

8. The device according to claim 2, wherein each combined laser cutting and welding head (14a, 14b) can be adjusted in the direction of its arm (13a, 13b).

9. The device according to claim 7, wherein each combined laser cutting and welding head (14a, 14b) can be adjusted in the direction of its arm (13a, 13b).

10. The device according to claim 2, wherein on the side of the sheets (15a, 15b) to be joined facing away from the cutting and welding heads (14a, 14b), means (17) are provided for the removal of cutting and welding waste, said means being able to move simultaneously with the cutting and welding heads (4a, 4b).

11. The device according to claim 7, wherein on the side of the sheets (15a, 15b) to be joined facing away from the cutting and welding heads (14a, 14b), means (17) are provided for the removal of cutting and welding waste, said means being able to move simultaneously with the cutting and welding heads (4a, 4b).

12. The device according to claim 8, wherein on the side of the sheets (15a, 15b) to be joined facing away from the cutting and welding heads (14a, 14b), means (17) are provided for the removal of cutting and welding waste, said means being able to move simultaneously with the cutting and welding heads (4a, 4b).

13. The device according to claim 9, wherein on the side of the sheets (15a, 15b) to be joined facing away from the cutting and welding heads (14a, 14b), means (17) are provided for the removal of cutting and welding waste, said means being able to move simultaneously with the cutting and welding heads (4a, 4b).

14. The device according to claim 2, wherein on the side of the sheets (15a, 15b) to be joined facing away from the cutting and welding heads (14a, 14b), a protective gas supply (17c) is provided, which can be moved simultaneously with the cutting and welding heads (4a, 4b).

15. The device according to claim 7, wherein on the side of the sheets (15a, 15b) to be joined facing away from the cutting and welding heads (14a, 14b), a protective gas supply (17c) is provided, which can be moved simultaneously with the cutting and welding heads (4a, 4b).

16. The device according to claim 8, wherein on the side of the sheets (15a, 15b) to be joined facing away from the cutting and welding heads (14a, 14b), a protective gas supply (17c) is provided, which can be moved simultaneously with the cutting and welding heads (4a, 4b).

17. The device according to claim 9, wherein on the side of the sheets (15a, 15b) to be joined facing away from the cutting and welding heads (14a, 14b), a protective gas supply (17c) is provided, which can be moved simultaneously with the cutting and welding heads (4a, 4b).

18. The device according to claim 10, wherein on the side of the sheets (15a, 15b) to be joined facing away from the cutting and welding heads (14a, 14b), a protective gas supply (17c) is provided, which can be moved simultaneously with the cutting and welding heads (4a, 4b).

19. The device according to claim 11, wherein on the side of the sheets (15a, 15b) to be joined facing away from the cutting and welding heads (14a, 14b), a protective gas supply (17c) is provided, which can be moved simultaneously with the cutting and welding heads (4a, 4b).

20. The device according to claim 12, wherein on the side of the sheets (15a, 15b) to be joined facing away from the cutting and welding heads (14a, 14b), a protective gas supply (17c) is provided, which can be moved simultaneously with the cutting and welding heads (4a, 4b).

21. The device according to claim 13, wherein on the side of the sheets (15a, 15b) to be joined facing away from the cutting and welding heads (14a, 14b), a protective gas supply (17c) is provided, which can be moved simultaneously with the cutting and welding heads (4a, 4b).

22. A method for producing tailored blanks from sheets (15a, 15b) to be joined by welding in the butt joint, in particular using a device according to claim 1,
wherein at least two combined laser cutting and welding heads (14a, 14b) are carried by extension arms (16a, 16b), which are carried by at least two independent arms (13a, 13b) associated with independent units (11a, 11b) of the advancing device, wherein the laser cutting and welding heads (14a, 14b) are carried by the extension arms (16a, 16b) with displacement in an advance direction with respect to the arms (13a, 13b) in such way that the at least two combined laser cutting and welding heads (14a, 14b) are moved simultaneously and directly side by side in the advance direction along the edges of the sheets held by a workpiece carrier, which edges are to be produced for the butt joint, and thereby cut the edges, and in that, after the bringing-together of the sheets (15a, 15b) for the butt joint and the holding of the sheets (15a, 15b) by the workpiece carrier, the two combined laser cutting and welding heads (14a, 14b) are then moved simultaneously along the produced edges of the sheets (15a, 15b) held by the workpiece carrier, which edges form the butt joint, and thereby produce the weld seam in different successive segments.

* * * * *